A. C. CALDWELL.
APPARATUS FOR ADMITTING AIR TO LIQUID FLOWS IN CONDUITS.
APPLICATION FILED JUNE 13, 1912. RENEWED JAN. 26, 1917.
1,238,103.
Patented Aug. 28, 1917.
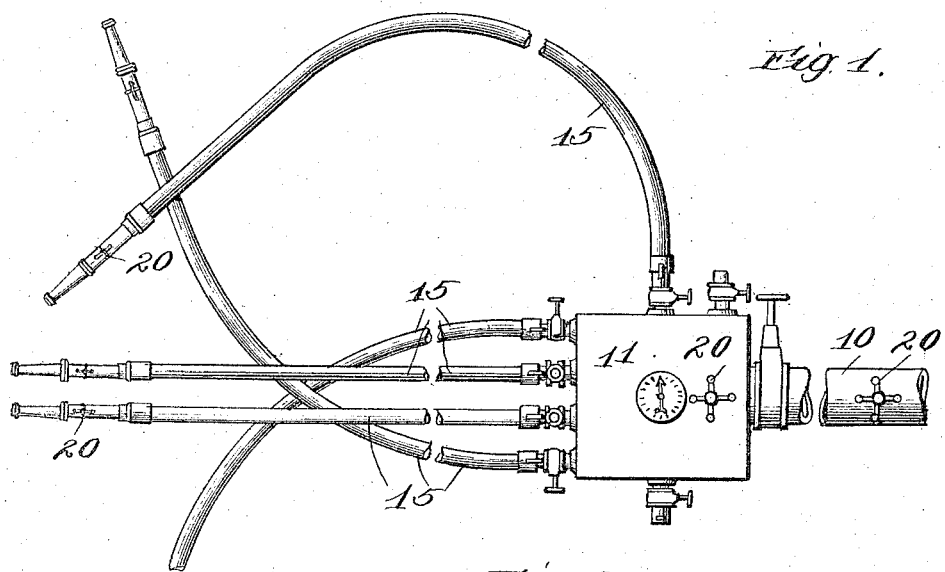
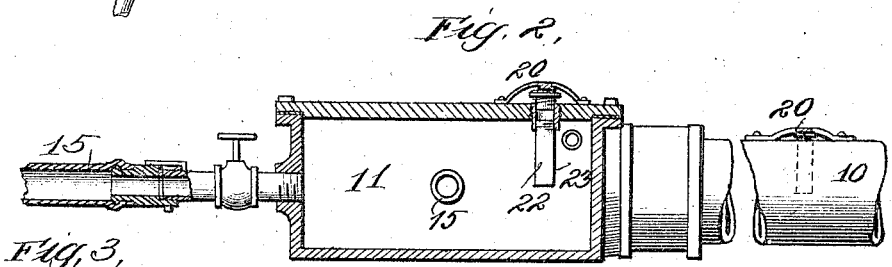
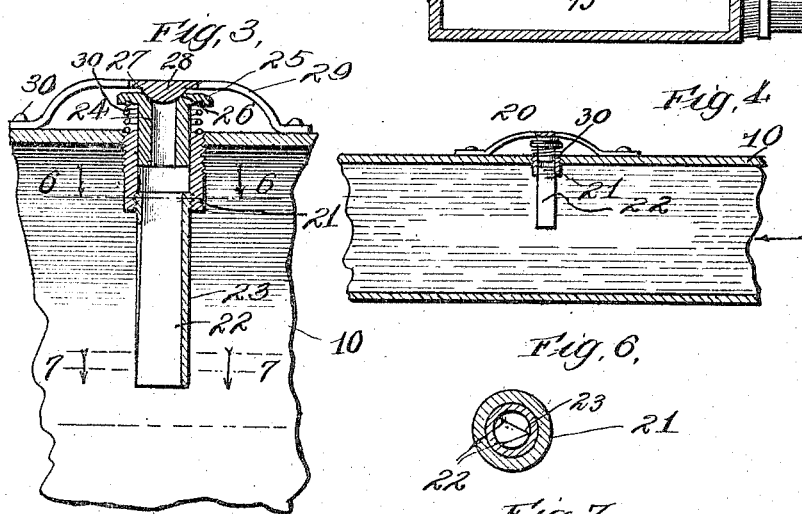
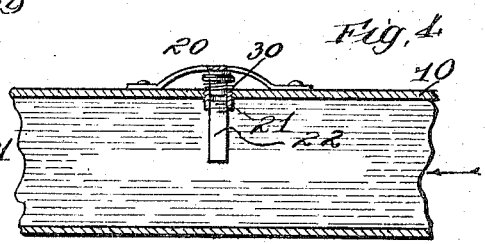
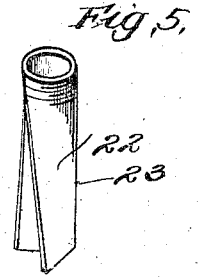
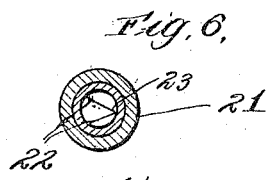
WITNESSES
INVENTOR
Alonzo C. Caldwell
Attorneys

UNITED STATES PATENT OFFICE.

ALONZO C. CALDWELL, OF ASHLAND, OREGON.

APPARATUS FOR ADMITTING AIR TO LIQUID-FLOWS IN CONDUITS.

1,238,103. Specification of Letters Patent. Patented Aug. 28, 1917.

Application filed June 13, 1912, Serial No. 703,551. Renewed January 26, 1917. Serial No. 144,772.

*To all whom it may concern:*

Be it known that I, ALONZO C. CALDWELL, a citizen of the United States of America, residing at Ashland, in the county of Jackson and State of Oregon, have invented certain new and useful Improvements in Apparatus for Admitting Air to Liquid-Flows in Conduits, of which the following is a specification.

This invention relates to means for the automatic admission of air to liquid flows in conduits, and has for its object to accomplish such results by simple, effective and inexpensive means applicable to all ordinary existing conditions.

A further object of the invention is to admit air into a liquid flow in a conduit, to obtain a resultant increase in the velocity and volume at the intake in the conduit flow, and at the outlet of such flow.

Briefly stated, the invention comprises the utilization in an inclosed liquid flow, either alone, or in combination with other devices employed in connection with the inclosing conduit, of means so constructed and arranged as to operate primarily to admit air into the conduit flow, and secondarily to eliminate hindrances to such flow.

The accompanying drawings illustrate embodiments of the invention under different existing conditions, without however, intending by the illustrated embodiments to confine the use or application of the invention, as obviously, the same may be applied to any condition arising in connection with the formation or probable formation of a hindrance in a liquid conduit flow.

In the accompanying drawings:

Figure 1 is a plan view showing the application of the invention to each of the nozzles of a plurality of hose, the hose being connected to a distributer which is in turn attached to a supply, the valve mechanism also being shown applied to the distributer and to the intake of the supply system.

Fig. 2 is a longitudinal sectional view of the distributer illustrated in Fig. 1 showing the application of the device to the distributer and also to the intake.

Fig. 3 is an enlarged sectional view of the valve mechanism in accordance with my invention, the same being shown applied to a main conduit, the latter being broken away.

Fig. 4 is a longitudinal sectional view of a part of a liquid conduit intake, showing the application of the valve mechanism thereto for the automatic admission of air into the said conduit intake.

Fig. 5 is a detached detailed perspective view of the liquid dividing member of the valve mechanism.

Fig. 6 is a cross-sectional view of the valve mechanism taken on the line 6—6 of Fig. 3, and, Fig. 7 is a similar view taken on the line 7—7 of Fig. 3.

In Figs. 1 and 2, the invention is shown as applied to a hose system, in which a plurality of discharge hose are fed from an intake or supply pipe 10. Such supply or conduit 10 discharges into what is termed a distributing box or distributer 11, with which communicate a plurality of discharge hose 15.

The improved valve mechanism by means of which air is admitted into the conduit is designated generally 20, and in the application of my invention, such as illustrated in Figs. 1, 2, and 4, is applied to each of the hose nozzles, to the distributing box 11, and to the intake 10, so as to admit air thereto.

The valve mechanism comprises a sleeve 21 secured in the wall of the conduit in any suitable manner, as by threading, as herein illustrated, and which extends into the liquid chamber or conduit, and carries at its inner end a combined liquid divider and air intake 22. This liquid divider is made with a tubular inner end exteriorly-threaded to connect with the interiorly-threaded free end of the sleeve 21, the major portion of the divider being open on one side, and the body below the tubular inner end made V-shape as clearly illustrated in Figs. 5 and 7, the apex 23 of the V being presented toward the inflow of the liquid, and the divider being of a length which will reach approximately to the longitudinal axis of the conduit.

Fitted to have sliding movement in the sleeve 21 is a hollow plunger 24, which may or may not, be provided with packing to effect a liquid tight joint between the exterior walls of the plunger and the interior walls of the sleeve. At its outer end the plunger 24 has a head 25, with a valve seat 26 formed around the upper end of the opening in the plunger 24, a gasket 27 being preferably provided on the seat, to be engaged by a valve 28 carried centrally of a spider 29 secured to the exterior of the conduit or other form of casing, as the case may be. Between the head 25 and the exterior wall of the conduit or casing, that is, surrounding the plunger 24 below its head 25, is a spring 30 tending normally to hold the plunger 24 in seated engagement with the valve 28.

As heretofore stated, the invention is adapted to be applied for the automatic admission of air in any conduit for liquid flows. In all such flows as are established by pumping, or by gravity, hindrances exist at some point or points in the flow, naturally decreasing the volume and velocity at the intake, in the conduit flow, and at the outlet.

With the valve mechanism positioned so that the divider 22 extends to a point in proximity to the axis of the conduit, it will be evident that upon the splitting or dividing of the liquid due to the divergent sides of the divider that atmospheric pressure upon the plunger 24 will overcome the tension of spring 30, thus unseating the plunger and allowing air to pass therethrough and through the divider 22, immediately restoring the full capacity of the conduit, or in other words, increasing the normal flow since the hindrance to the volume and velocity of the liquid flow has been eliminated.

In pumping, any hindrance that may occur is between the intake and the point where the power is applied, whereas in a gravity flowing column of liquid, such hindrance to the full capacity flow of the conduit is between the intake and the outlet. Now, by the employment of the means as above set forth, it will be observed that any hindrance in the conduit flows is immediately destroyed, thus maintaining substantially constant, the full capacity or volume of the conduit and the velocity of the flow, and increasing the velocity at the outlet over that which would obtain if a hindrance existed.

What I claim is:—

1. The combination with a conduit, of a sleeve projecting therein, a combined air intake and liquid divider carried by the inner end of the sleeve, a headed spring-pressed plunger mounted in the outer end of the sleeve, and a fixed valve arranged normally to close the outer end of the plunger.

2. The combination with a conduit, of a sleeve projecting therein, a combined air intake and liquid divider carried by the inner end of the sleeve, a spring-pressed plunger mounted in the outer end of the sleeve and provided with a head having a valve seat, and a fixed valve arranged normally to engage the seat.

3. The combination with a conduit, of a sleeve projecting therein, a combined air intake and liquid divider carried by the inner end of the sleeve, a spring-pressed plunger mounted in the outer end of the sleeve and provided with a head having a valve seat, and a spider secured to the conduit and carrying a valve of less circumference than and arranged normally to engage the seat.

4. Means for admitting air to conduits for liquid flows, comprising a sleeve, a combined air intake and liquid divider carried by one end of the sleeve, a spring-pressed plunger carried by the other end of the sleeve and provided with a head having a valve seat, and a spider arranged to be secured to the conduit and carrying a valve of less circumference than and arranged normally to engage the seat.

In testimony whereof I affix my signature in presence of two witnesses.

ALONZO C. CALDWELL.

Witnesses:
MILTON E. LOURY,
A. M. WILSON.

Copies of this patent may be obtained for five cents each, by addressing the "Commissioner of Patents, Washington, D. C."